(No Model.)

T. W. PETWAY & W. L. MULLINS.
COFFEE ROASTER.

No. 498,299. Patented May 30, 1893.

Witnesses
L. C. Hill
E. H. Bond

Inventors
Thomas W. Petway,
William L. Mullins.
per Chas. H. Fowler
Attorney

UNITED STATES PATENT OFFICE.

THOMAS WINSTON PETWAY AND WILLIAM LEVI MULLINS, OF WHITE BLUFFS, TENNESSEE.

COFFEE-ROASTER.

SPECIFICATION forming part of Letters Patent No. 498,299, dated May 30, 1893.

Application filed July 30, 1892. Serial No. 441,746. (No model.)

*To all whom it may concern:*

Be it known that we, THOMAS WINSTON PETWAY and WILLIAM LEVI MULLINS, citizens of the United States, residing at White Bluffs, in the county of Dickson and State of Tennessee, have invented certain new and useful Improvements in Coffee-Roasters; and we do hereby declare that the following is a full, clear, and exact description of the same, reference being had to the annexed drawings, making a part of this specification, and to the letters of reference marked thereon.

This invention relates to certain new and useful improvements in coffee roasters and it has for its objects among others to provide an improved device for this purpose by which the coffee will be better roasted without danger of burning, the vessel in which the coffee is placed being held at a distance from all sides of the vessel in which it is arranged. A sight opening is provided in the outer receptacle.

Other objects and advantages of the invention will hereinafter appear and the novel features thereof will be specifically defined by the appended claim.

The invention is clearly illustrated in the accompanying drawings, which, with the letters of reference marked thereon, form a part of this specification and in which—

Figure 1:
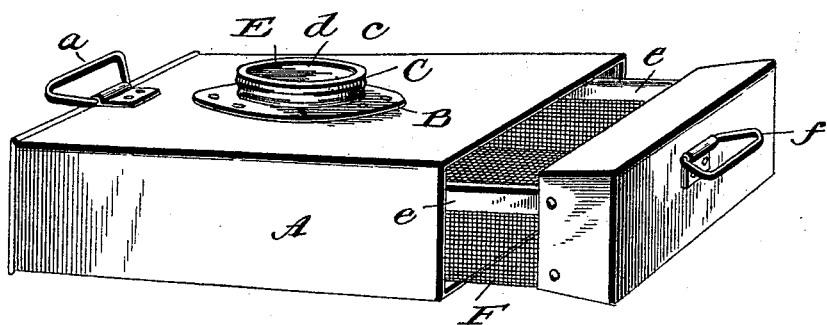
Figure 2:
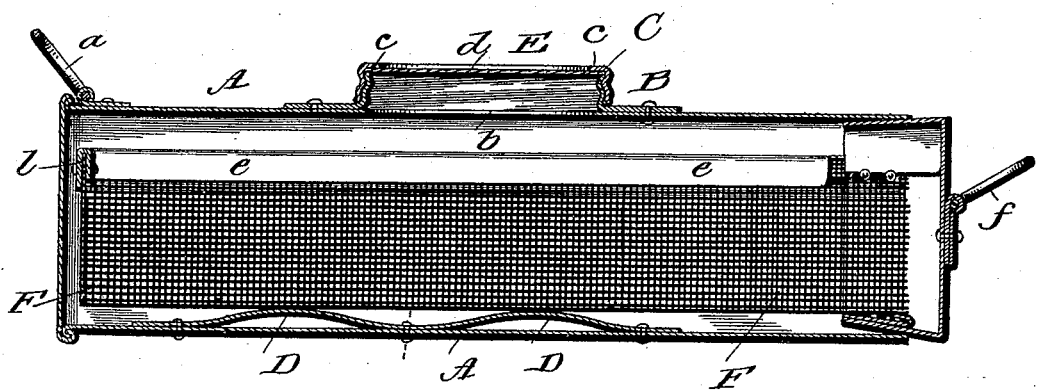
Figure 3:
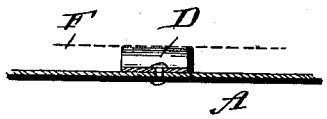

Figure 1 is a perspective view of our improved coffee roaster with the inner vessel partly withdrawn. Fig. 2 is a central vertical longitudinal section. Fig. 3 is a sectional detail of the spring at the bottom of the outer receptacle.

Like letters of reference indicate like parts throughout the several views in which they appear.

Referring now to the details of the drawings by letter, A designates the outer receptacle which in this instance is shown as an oblong metallic case open at one end and at the other provided with a handle $a$ which may be of any desired form. Upon the top of this outer vessel preferably near its center is an opening $b$ as seen best in Fig. 2 around which is a threaded neck piece B which has a flange by which and suitable rivets or other means it is secured to the top of the receptacle as seen in Figs. 1 and 2. A threaded cap piece C is provided for engagement with the threads of this neck piece and having a central opening $d$ and a flange $c$ as seen in Figs. 1 and 2 between which and the top of the neck piece is held a piece of transparent material E as seen best in Fig. 2. This provides for ready access to the interior without removing the inner vessel and also provides a sight opening by which the condition of the contents may be viewed without admitting air. Upon the inner face of the bottom of the outer receptacle is secured a spring strip D which extends lengthwise of the receptacle as seen in Fig. 2 and which is of sufficient size and strength to support yieldingly the inner receptacle when filled with coffee. This spring strip may be secured in any suitable manner and is preferably humped twice or more as shown in Fig. 2 to provide more than one bearing for the inner vessel as seen in Fig. 2.

F is the inner receptacle; it has its bottom, two sides and its inner end formed of some suitable reticulated medium suitably held as by a marginal strip $e$ as seen in Figs. 1 and 2 and this reticulated medium is secured to the front end of the vessel which is of sheet metal with tapered top and bottom and ends, the front being provided with a suitable handle $f$.

In practice, the coffee to be roasted is placed in the inner vessel and the latter then placed in the open end of the outer receptacle and forced in when the tapered sides and ends of the inner vessel will fit tightly the inner walls of the outer receptacle as seen in Fig. 2 and make a tight joint, the bottom of the inner vessel resting upon the spring strip which thus holds the bottom away from the bottom of the outer vessel, the sides and end of the inner vessel being also held away from the walls of the outer receptacle so that the walls of the inner vessel do not touch the walls of the outer vessel at any point. Hence there is no danger of burning of the coffee. The height of the inner vessel is considerably less than that of the outer receptacle as seen in Fig. 2 so as to provide an air space over the coffee.

What is claimed as new is—

The coffee roaster described consisting of the outer receptacle with open end and opening in its top with removable cap piece and transparent plate, a spring strip secured upon the inner face of the bottom of said receptacle and secured at each end and near the middle, thus being double humped as shown, and the inner removable vessel having reticulated walls and bottom and a metallic front end with tapered walls forming the end of the inner and outer vessels and to which the walls and bottom are secured and a handle, all substantially as shown and specified.

In testimony that we claim the above we have hereunto subscribed our names in the presence of two witnesses.

THOS. WINSTON PETWAY.
WILLIAM LEVI MULLINS.

Witnesses:
A. M. PETWAY,
J. H. BUCHANAN.